(12) United States Patent
Sambasivan et al.

(10) Patent No.: US 9,988,316 B2
(45) Date of Patent: Jun. 5, 2018

(54) PROTECTIVE INTERNAL COATINGS FOR POROUS SUBSTRATES

(71) Applicant: Applied Thin Films Inc., Skokie, IL (US)

(72) Inventors: Sankar Sambasivan, Chicago, IL (US); Vikram Sharad Kaul, Atlanta, GA (US); Francis Richard Chapman, Mount Prospect, IL (US)

(73) Assignee: Applied Thin Films, Inc., Skokie, IL (US)

( * ) Notice: Subject to any disclaimer, the term of this patent is extended or adjusted under 35 U.S.C. 154(b) by 491 days.

(21) Appl. No.: 14/612,482

(22) Filed: Feb. 3, 2015

(65) Prior Publication Data
US 2015/0147562 A1 May 28, 2015

Related U.S. Application Data

(63) Continuation of application No. 13/608,773, filed on Sep. 10, 2012, now abandoned.

(51) Int. Cl.
| | |
|---|---|
| *B05D 3/02* | (2006.01) |
| *C04B 38/00* | (2006.01) |
| *C04B 35/195* | (2006.01) |
| *C04B 41/00* | (2006.01) |
| *C23C 18/12* | (2006.01) |
| *F01D 5/28* | (2006.01) |
| *C04B 41/85* | (2006.01) |
| *C04B 41/50* | (2006.01) |

(52) U.S. Cl.
CPC ........ *C04B 38/0096* (2013.01); *C04B 35/195* (2013.01); *C04B 38/0054* (2013.01); *C04B 41/009* (2013.01); *C04B 41/5092* (2013.01); *C04B 41/85* (2013.01); *C23C 18/125* (2013.01); *C23C 18/1216* (2013.01); *C23C 18/1229* (2013.01); *F01D 5/288* (2013.01); *C04B 2235/3206* (2013.01); *C04B 2235/3208* (2013.01); *F05D 2300/514* (2013.01); *F05D 2300/6033* (2013.01); *Y02T 50/672* (2013.01); *Y10T 428/24997* (2015.04); *Y10T 428/249921* (2015.04); *Y10T 428/249967* (2015.04); *Y10T 428/249969* (2015.04); *Y10T 428/249978* (2015.04); *Y10T 428/268* (2015.01)

(58) Field of Classification Search
CPC .................................................. C04B 38/0096
See application file for complete search history.

(56) References Cited

U.S. PATENT DOCUMENTS

| | | | | |
|---|---|---|---|---|
| 3,441,381 A | * | 4/1969 | Schreuders | B01D 53/944 422/119 |
| 2007/0017196 A1 | * | 1/2007 | Choi | B01D 39/2068 55/523 |
| 2007/0134408 A1 | * | 6/2007 | Skoog | C09D 1/00 427/142 |
| 2007/0184204 A1 | * | 8/2007 | Balagopal | C23C 2/02 427/419.2 |
| 2011/0281110 A1 | * | 11/2011 | Sambasivan | C01B 33/26 428/336 |

\* cited by examiner

*Primary Examiner* — Tabatha Penny

(57) ABSTRACT

A material contains open pores in which the channels and pores that are internally coated with at least one layer of phosphorus-containing alumina. Such material is formed by infiltrating a porous material one or more times with a non-colloidal, low-viscosity liquid coating precursor, drying, and curing the coating precursor to form a phosphorus-containing alumina layer within pores of the material.

19 Claims, No Drawings

PROTECTIVE INTERNAL COATINGS FOR POROUS SUBSTRATES

CROSS-REFERENCE TO RELATED APPLICATIONS

This disclosure claims the benefit of priority to U.S. patent application Ser. No. 13/608,733, filed 10 Sep. 2012, which claims priority to PCT/US12/27355, filed 1 Mar. 2012, which claims priority to U.S. Prov. Pat. Appl. 61/448,268, filed 2 Mar. 2011, the disclosures of which are incorporated herein by reference in their entirety.

GOVERNMENT LICENSE RIGHTS

This invention was made, in part, with government support under Contract No. N68335-09-C-0213 and Contract N68335-08-C-0015 each awarded by the U.S. Department of Defense. The U.S. government has certain rights in the invention.

FIELD OF THE INVENTION

This invention relates to internal coatings for substrates with open pores and more particularly relates to metal oxide based coatings applied to porous advanced materials for use at high temperatures or in corrosive environments.

BACKGROUND

Typically, advanced high performance materials must remain stable and retain structural integrity over a wide range of environmental and temperature conditions. Many such advanced performance materials contain, or are attached to, a surface substrate containing open pores and channels, which act as a thermal or corrosion barrier with respect to underlying materials. Examples of use of such high performance materials include components incorporated into turbine engines such as used in aircraft, aerospace, and energy and power generation applications. In such a turbine, hot combustion gasses contact components such as rotors, turbine blades, vessels, and shrouds. Other applications of high performance materials include ceramics, ceramic matrix composites (CMC), plasma-sprayed ceramic coatings, and refractories.

Materials and articles containing inorganic porous surfaces are used extensively in many industrial applications to provide thermal insulation, heat resistance, reduced weight, or increased toughness. Such a porous surface material may be metallic or ceramic. An example of such an article is an external coating of a porous material on an underlying metallic or ceramic material. Typical porous industrial articles contain open pore channels of varying sizes (dimensions of several micrometers down to nanometers in pore diameter) and geometries. These open pore channels often compromise the chemical, mechanical, and electrical properties of these articles. An aspect of this invention is an internal coating within a pore structure that can provide environmental protection and can maintain or improve the chemical, mechanical, and electrical properties of such articles Specific applications of high performance materials or substrates useful in this invention include, but are not limited to, thermal barrier coatings, thermal protection systems, radiation shielding systems, heat rejection systems, lightweight thermally stable structural members and systems for active or passive functionality, environmental barrier coatings and systems, anodized metals, metallurgical overlay coatings, plasma spray coatings, ceramic metal composite coatings, electron beam physical vapor deposition derived coatings, and slurry coatings. Articles embodying these applications may include, but not limited to, refractory ceramics and composites, turbine engine components, exhaust or airframe components, and other aerospace or utility land-based power generation turbine hardware.

A purpose and function of these high performance materials is based in the high stability of the materials to harsh environments such as to extremely high temperatures that may be above 500° C., typically above 800° C., and especially above 1000° C. Typical harsh environments include an oxidizing, reducing, high temperature, or vacuum atmosphere, and additional atmospheric components such as water (vapor or liquid), and common atmospheric contaminants such as dust, dirt, sand, ash, fuel additives/contaminants or biofuel derivatives, and various organic compounds. Further, porous ceramic materials or coatings used at elevated temperatures for extended periods may experience sintering in which pores coalesce. Such sintering may result in variation of thermal insulation properties and additional stress that may degrade the integrity of the material. Added requirements imposed by such harsh environmental conditions associated with the high temperatures are directed to stability of the materials with respect to conditions, such as oxidation, corrosion, embrittlement, fatigue, mechanical wear, stress cracking, structural changes such as sintering or densification, loss of adhesion or loss of material (mass or thickness), reduction, and chemical reaction.

Pore coalescence is the accumulation of multiple pores to a common proximity and subsequent union of the pores to form a lesser number of larger pores. This process is favored when the mobility of pores within a material is sufficiently high to allow the pores to accumulate in proximity to one another; the joining step then will occur quickly once the proximity of neighboring pores is sufficient. This process can be substantially impeded through increased bonding within the bulk of a material, which can be accomplished through heat-treating or reaction-based doping processes.

A grain is an amount of material that exhibits a consistent phase and crystal structure orientation over some finite scale, typically on the order of 10 nanometers to 100 μm, and often referred to as a crystallite. Polycrystalline materials are comprised of a multitude of small grains. Grains comprise all ordered materials, including ceramics, metals, and many polymers.

Grain growth is the process of the joining of multiple small grains, which are in proximity to one another to form a lower number of larger grains. This process is favored when grain boundary mobility is sufficiently high to allow grain boundaries to impinge into neighboring grains. Grain growth processes decrease porosity and impart mechanical stresses into the bulk of the material, which often have detrimental consequences, often resulting in the destruction of intentionally engineered material architectures and stress fields.

Other porous materials that experience corrosion and sintering at high temperatures include refractory materials, such as used in steel manufacture or used in furnaces, kilns, reactors, or incinerators. A typical refractory is a metal oxide such as oxides of aluminum, magnesium, calcium, titanium, zirconium, and chromium. Other refractory materials include silica, silicon carbide, and graphite. A refractory material may contain mixtures of refractories.

A thermal barrier coating may be prepared from a ceramic material, such as a chemically (metal oxide) stabilized zirconia. Examples of such chemically stabilized zirconia include yttria-stabilized zirconia, scandia-stabilized zirconia, calcia-stabilized zirconia, magnesia-stabilized zirconia, and combinations thereof. The thermal barrier coating of choice, typically, is an yttria-stabilized zirconia ceramic coating. A representative yttria-stabilized zirconia (YSZ) thermal barrier coating usually contains about 7 wt. % yttria and about 93 wt. % zirconia. The thickness of the thermal barrier coating depends upon the metal part or component it is deposited on, but is usually in the range of from about 0.5 to about 2 millimeters (typically 0.1 to 1 mm) thick for high temperature gas turbine engine parts.

To prevent turbine components from getting too hot, thermal barrier coatings (TBC's) often are coated onto various surfaces of the turbine components to insulate the components from the high temperatures in the hot gas path. TBC's are an increasingly important component in current and future gas turbine engine designs because of the higher operating temperatures in gas turbine engines. Examples of turbine engine parts and components for which such thermal barrier coatings are desirable include turbine blades and vanes, turbine shrouds, buckets, nozzles, combustion liners and deflectors, and the like. These thermal barrier coatings typically are deposited onto a metal substrate (or more typically onto a bond coat layer on the metal substrate for better adherence) from which the part or component is formed. The TBC reduces heat flow and limits the operating temperature experienced by such metal parts and components. A suitable metal substrate typically is a metal alloy such as a nickel-, cobalt-, and/or iron-based alloy (e.g., a high temperature super alloy).

Although significant advances have been made in improving durability of thermal barrier coatings on metal substrates such as for turbine engine components, these coatings still are susceptible to various types of damage, including objects ingested by an engine, erosion, oxidation, and attack from environmental contaminants. In addition, in trying to achieve reduced thermal conductivity, other properties of the thermal barrier coating can be adversely impacted. For example, the composition and crystalline microstructure of a thermal barrier coating, such as those prepared from yttria-stabilized zirconia, can be modified to impart to the coating an improved reduction in thermal conductivity, especially as the coating ages over time. However, such modifications also can unintentionally interfere with desired spallation resistance, especially at the higher temperatures that most turbine components experience. As a result, the thermal barrier coating can become more susceptible to damage due to the impact of, for example, objects and debris ingested by the engine and passing through a turbine sections thereof. Such impact damage eventually can cause spallation and loss of the thermal barrier coating.

Chemical-based pore obliteration can occur when a porous material is involved in chemical reactions with an externally introduced reactant, which often is a contaminant species. Because environmental conditions and contaminants are present in widely variable ranges, a great number of possible reactions are common in advanced material applications and are magnified with increasing temperatures. A common reactant for thermal barrier coatings, for example, is a calcium aluminosilicate-based glassy material, which is found as a constituent in sand and dust. The starting sand and dust material is found commonly in the atmosphere in areas around the world, and may be ingested into turbine engines on aircraft as well as stationary power generating equipment. Sand or debris is melted in the high temperature environment inside a turbine engine, and the resulting molten material is deposited onto hot surfaces of internal structures of a turbine engine, which are coated with porous thermal barrier coatings. Molten sand debris, the predominant constituent of which is a slag-like and glassy mix of calcium-magnesium-aluminosilicates (referred to as "CMAS"), infiltrates into porous structures of a thermal barrier coating upon contact. Ceramic oxide-based thermal barrier coatings typically are very reactive with CMAS compositions and, essentially, dissolve into solution in the CMAS. Reaction products are precipitated from the dissolution melt that are more stable than the original CMAS+ TBC mixed system. Thus, the originally designed porous architecture of the TBC is eliminated as the chemical reaction with CMAS progresses and functionality of the starting TBC material declines.

Solidified CMAS causes stresses to build within the thermal barrier coating, leading to partial or complete delamination and spelling of the coating material and, thus partial or complete loss of the thermal protection provided to the underlying metal substrate of the part or component.

Pores, channels, or other cavities that are infiltrated by such molten environmental contaminants can be created by environmental damage or even the normal wear and tear that results during the operation of the engine. However, the porous structure of pores, channels, or other cavities in the thermal barrier coating surface more typically is the result of processes by which the thermal barrier coating is deposited onto the underlying bond coat layer-metal substrate. For example, thermal barrier coatings that are deposited by air plasma spray techniques tend to create a sponge-like porous structure of open pores in at least the surface of the coating. By contrast, thermal barrier coatings that are deposited by physical (e.g., chemical) vapor deposition techniques tend to create a porous structure comprising a series of columnar grooves, crevices or channels in at least the surface of the coating. This porous structure can be important in the ability of these thermal barrier coatings to tolerate strains occurring during thermal cycling and to reduce stresses due to the differences between the coefficient of thermal expansion (CTE) of the coating and the CTE of the underlying bond coat layer/substrate. CMAS mitigation coatings often are needed for gas turbine operation above 1200° C. Many turbine engines operate in this temperature regime. Without CMAS mitigation, functionality of a TBC often is compromised, and the component may fail. Coatings of alumina have been used to mitigate CMAS attack; however, this approach has not been successful largely due to poor distribution of alumina throughout the porous network. Addition of alumina to the CMAS increases its melting point, thereby arresting its molten flow and, consequently, its degrading effect. Thus, in this case, the alumina acts as a sacrificial layer to arrest further flow or degradation, which effectively protects the substrate from CMAS attack.

In general, most porous ceramic coatings and materials are designed to retain porosity to exploit mechanical properties (toughness), low density (e.g., in aerospace/transportation), filtration, and thermal insulation; however, these porous coatings are prone to environmental degradation. There is a need selectively to deposit or plug the porosity with an inert material without substantially altering the overall porosity level or microstructure to retain the properties. Also, there is a need to protect pore walls from reacting with environmental species. Such protection needs to be done preferably with a high temperature stable material that is inert, chemically compatible with various substrate materials, and remains morphologically stable upon long-term high temperature exposures.

Porous ceramic materials and composites also may exhibit lower mechanical strengths compared to their higher density counterparts. Such lower strengths are partially attributable to micro-scale flaws (on pore walls or interiors) contained within porous microstructures. The internal coatings of the present invention may heal such flaws and provide an improvement in mechanical strength and toughness of the porous substrate material. External porous coatings, such as thermal barrier or insulation coatings on a structure also are subject to severe erosion in harsh environments. Internal pore coatings of this invention may improve performance of these external coatings under erosion conditions.

Anodized aluminum is commonly used in many consumer and industrial products to impart corrosion protection. However, anodized aluminum has a thin amorphous alumina surface that contains micro-scale open porosity that serves as pathways for moisture, salt, or other environmental contaminants to penetrate and attack the underlying non-anodized metal. There is a need to seal at least partially the open porosity in these coatings to enhance their corrosion protection.

Porous materials and coatings also are used as dielectric materials or to provide electrical insulation in many use applications. Presence of open pore channels often may compromise the durability of the materials over time due to ingress of environmental species that alter the electrical properties either by the presence of such species or through reaction with pore walls. There is a need for a system that creates long term stability during operation and service of porous materials to maintain their designed electrical properties.

There is a need for an effective system to protect porous advanced high performance materials against harsh environmental conditions experienced during use without significantly affecting physical properties of such materials such as strength, weight, thermal conductivity, wear tolerance, stress cracking resistance, and the like. Further, there is a need to minimize sintering in porous materials at elevated temperatures.

Conventional attempts to mitigate harsh environmental conditions on porous advanced high performance materials include placing a coating or a metallurgical overlay coating on the exterior surface to completely fill pores of such materials. However, such exterior coatings (e.g., a topcoat) tend not to be hermetic or tend to crack or spall during thermal cycling such that the sealing is not effective or durable. Other known protective techniques, such as use of nanoparticle-based alumina slurries to infiltrate fine pores of a thermal barrier coating, do not yield conformal coatings on the pore walls and do not produce sufficient environmental protection. Use of metal organic chemical vapor deposition (MOCVD) alumina coatings has been described to infiltrate the finer pores in thermal barrier coatings. However, these coatings have high cost and may not be suitable for large complex-shaped components, and such coatings may not have an ability to infiltrate fine pores without adversely affecting TBC properties such as strain tolerance. Further, this technique may not be suitable for use in the field or for repair. Slurry-based systems to deposit alumina-based films into a porous substrate may not be suitable to deposit conformal films on pore walls or may not penetrate very small pores or uniformly infiltrate through the depth of the porous substrate and, thus, may not provide adequate environmental protection. Presently, there are no practical methods of depositing clear, low viscosity, high yield solutions to form good quality alumina-based films onto pore walls of a porous substrate.

This invention provides a solution to providing an internal coating of a porous substrate to form a superior environmental protection system, that further is capable of maintaining or improving chemical, mechanical, and electrical properties without significantly affecting desirable properties of a porous advanced material. A pore wall barrier internal coating and selective blocking of mesopores may be created without having a detrimental effect on the design properties of such materials.

SUMMARY

A material contains a porous substrate containing open pores and channels that are internally coated with at least one layer of phosphorus-containing alumina. Such material is formed by infiltrating a porous material one or more times with a non-colloidal, low-viscosity liquid coating precursor, drying, and curing the coating precursor to form a continuous phosphorus-containing alumina layer within pores of the material.

DETAILED DESCRIPTION

Typical high performance materials useful in this invention are based on a porous (non-fully dense) structure. The architecture of these materials may be designed for the application for which the advanced material will be used, such as providing a sufficiently low thermal conductivity structure joined to another material to permit use of other materials at elevated thermal or radiation conditions. Pore structures typically dominate the proportion of free surface area of these materials, with common surface area proportions that are associated with pores alone being 90% or higher, often 98% or above, depending on the overall material thickness and roughness of the externally free surface of the bulk material structure.

The presence of pores including open and closed pores within high performance materials serve various purposes, and can be the result of intentional processes to achieve pore formation, or unintentional processes that result from methods of forming or creating the materials. A function of the pores typically includes increasing mechanical toughness (e.g., resistance to fracture propagation under dynamic loading), decrease in weight, and increase in resistance to thermal conduction and fatigue at elevated temperatures during service. Presence of pores in advanced materials in extreme temperature environments is critical for effective performance, and maintaining the designed pore structure is paramount to the determination of the effectiveness and useful lifetime of those materials during normal operation. Thus, protection and maintenance of the initially designed pore microstructure is important in order to achieve the design function for such advanced materials over a sufficient useful lifetime.

Porous substrates that are subject to extreme temperature variation during service are subject to stress fracture. Typically, stress fracture may be caused by thermal expansion and contraction of a porous material due to thermal cycling in service. If such a porous substrate is coated with a material that passivates the surface of the substrate (typically referred to as a topcoat), repeated expansion and contractions of the underlying porous substrate may cause cracks in the surface coating or the surface may be subject to erosive or abrasive conditions in a service environment which compromises the integrity of the topcoat. Cracks in a surface coating will expose the underlying porous substrate to environmental conditions such as heat, contaminants, and oxidizing gases, which may degrade the substrate properties. However, coating interior surfaces of a porous material in accordance with this invention will not be subject to degradation from such thermal stresses.

Pores are macroscopic-scale voids in a material characterized by an internal surface area interfacing with a gaseous environment. Pores are inherently unstable in a thermodynamic sense because the internal surface area contains stored potential energy that, when driven off, creates a more stable material (i.e., having less stored energy). Prevailing mechanisms for pore deterioration include sintering, grain growth, chemical reaction based pore obliteration, and pore coalescence, the driving force of which is minimization of overall energy through reduction in surface energy through pore eradication. Elevated temperatures applied to a porous material promotes pore deterioration because the activation energy required for such destructive process is reduced in proportion to the temperature increase, which is a particularly challenging issue for advanced materials used at high temperatures. According to the present invention, a conformal coating applied to inner surfaces of open pores resists sintering and thereby promotes retention of the original pore structure, which provides durable performance in use at elevated temperature or under other environmental conditions.

Sintering processes (i.e., thermally driven densification) occur naturally as a result of entropically favored overall energy state reduction and are increased substantially as temperatures increase. The result of sintering is the reduction in the size of pores in a bulk material over time, yielding an increasingly dense bulk material with minimum total overall surface area (internal and external free surfaces). Sintering induces growth stresses, which lead to microcracking and material degradation in service especially under thermal cycling conditions.

An aspect of this invention is forming a thin, protective layer of a phosphorus-enriched alumina or phospho-alumina onto the interior surfaces of a porous material with open porosity (i.e., having pores in open communication with the exterior surface of the material). An effect of such interior layer (or a combination of sublayers) is to provide protection against harsh environmental conditions that would cause corrosion or oxidation of the material. A further benefit of such interior coating layers is to maintain physical or mechanical properties of the material such as thermal conductivity, stress crack resistance, electrical properties, and weight reduction. Depending on the specific use of the material, some benefits may be more advantageous than others in practice. For example, maintenance of weight reduction may be more important than thermal conductivity in some applications. In any regard, porous materials with interior coatings produced through this invention may demonstrate one or more other advantageous properties such as maintenance of stress crack resistance and corrosion inhibition.

Typical porous material substrates useful in this invention are shaped articles formed from substances such as a metal, metal oxide, refractory, ceramic, or ceramic matrix composite materials. These articles are solid inorganic materials that contain structures with internal pore spaces or channels that are in open communication to the exterior surface of the material. Porous substrates include a ceramic material or coating, a ceramic matrix composite, or a metal or metal alloy. Typical porous substrate materials used in this invention typically are metal oxides and carbide/nitrides (ceramics), but may include elemental materials such as metals and carbon (graphite), as well as composite materials from carbon, metal, or particulate or fiber-reinforced metal or ceramic composites and metallic foams. Especially useful are oxides of aluminum, zirconium, hafnium, tantalum, titanium, chromium, nickel, silicon, yttrium, and cerium, and the metals of titanium and titanium alloys, nickel and nickel, cobalt, and iron based superalloys, tungsten, rhenium, and hafnium, as well as metals of aluminum, titanium, chromium, nickel, iron, and cobalt in the form of sacrificial oxide formers, and silicon carbide and silicon nitride, fused silica, aluminosilicates, perovskite oxides ($ABO_3$ repeating cell blocks), pyrochlore oxides ($A_2B_2O_6$ and $A_2B_2O_7$), and carbon. Typically, suitable porous substrates suitable for use in this invention may be inorganic or organic structures that contain open pores and that are stable at curing temperatures used to form the phospho alumina internal coatings of this invention.

A benefit of the invention is a protective barrier coating within a porous structure (such as a barrier against oxidation or other corrosion) which is securely bonded to the interior surfaces of the substrate and which remains an effective barrier or passivation coating after prolonged environmental exposures such as prolonged exposure to high temperature in an oxidative environment. Typical harsh environmental conditions to which coated substrates of this invention may be exposed include temperatures above 800° C., typically above 1000° C. and may exceed 1200° C. and further exposure to corrosive materials such as gases, including but not limited to, oxygen, water vapor, hydrogen, carbon monoxide, and other chemical substances such as molten CMAS. Typical internally coated porous materials on substrates formed in accordance with this invention are expected to maintain corrosion resistance for hundreds to thousands of hours at high temperature oxidizing conditions. An internally coated porous materials on substrates formed in accordance with this invention will slow CMAS infiltration and, thus, prolong the useful service life an article subjected to CMAS attack. In the present invention, alumina, in the form of phospho-alumina coating is distributed more uniformly throughout the porous network, thus providing a "local" source of alumina to CMAS for more effective protection. As CMAS flows through the pore channels, CMAS interacts with phospho-alumina, whereby alumina content in CMAS is increased which raises the melting point of the CMAS-containing mixture, thus arresting further flow. This effect is particularly important in mesopores because mesopores comprise the bulk of open porosity surface area in YSZ TBCs and hence the importance of coating mesopores.

Porous material substrates useful in this invention typically contain pores with interior channels that have communication to the surface of the substrate. Such channels may be interconnected and may contain pore structures, all of which form a part of a porous substrate material containing pores. The interior pores may have varying widths or sizes and typically may range from 5 micrometers (5 μm) or more to 30 nanometers (nm) or less. These pores typically have an irregular cross-section with diameters measured as mean (average) diameters. More typically, porous substrates useful in this invention contain an open pore network (i.e., with open communication with the surface) with channels with channel diameters of up to 2 micrometers, typically up to 1 micrometer, many times up to 200 nm or up to 100 nm. Some pore channels usually have diameters greater than 2 nm (typically greater than 4 nm) and may have diameters of 30 nm or less, and may be up to 50 nm. Typical pore networks have channels ranging from 200 nm to 20 nm with a majority of the channel volume in channels having diameters of 30 to 100 nm. Under IUPAC nomenclature "micropores" have diameters less than 2 nm, "mesopores" have diameters ranging from 2 to 50 nm, and "macropores" have diameters ranging from 50 to 1000 nm (1 µm) (although as used in this invention a macropore is considered to range up to 2000 nm (2 µm)). Thus, a typical suitable porous substrate material useful in this invention contains a substrate containing an open pore network with combination of mesopores and macropores. Such a substrate material also may contain pores with mean pore diameters up to 3 or up to 5 micrometers.

Pore volume or porosity may be measured by the Archimedes displacement method. Pore volume and surface area may be measured using the BET technique or other suitable techniques such as helium pycnometry.

Pores contained in porous materials useful in this invention (which may be mesopores and macropores) refer to pores and interconnected channels, which typically form a complex web of internal spaces or voids of varying dimensions and form. Typical forms of pores are extended tubes and spaces of varying dimension and cross-section shape connected in a network. A porous material with open pores contains pores with open communication with the surface of the material. The terms "pores", "channels", or "pore channels" may not necessarily be descriptive of the actual shape of the internal porous structure of a porous material, but are used to describe the network of internal spaces contained in such materials and collectively described as pores. Although main channels may be 2 to 0.1 micrometers (2000 to 100 nm) in mean diameter, there may be very fine pore channels connected to such main channels that have mean diameter dimensions of less than 50 or less than 20 nanometers.

In typical porous materials used in this invention, the pore volume and surface area represented by the mesopores may be as great or greater than the pore volume and surface area represented by the macropores. Thus, protection of the mesopores from environmental degradation is important to maintaining the desired beneficial physical properties of such porous materials. In porous material substrates useful in this invention internal pore volume typically may be at least 1% of the gross volume of the substrate and may be up to 60% or more of the gross volume. In a typical porous substrate the internal pore volume is at least 5 or 10% of the gross volume and may be up to 40 or 50% of the gross volume. Also in a typical porous substrate useful in this invention the ratio of mesopores to macropores typically may range from 1 to 10 to 1000 to 1. Typically, mesopores constitute 25% or more of the surface area of the substrate and may range up to 75% or up to 99% or up to 99.99% of the surface area and may be 30 to 60% of the surface area. However, mesopores may constitute 25% or more of the porosity of the substrate and range up to 75%, or up to 99% or up to 99.99% of the measured porosity and may be 30 to 70% of the measured porosity.

In one aspect of this invention, substantial porosity of internally coated substrates is maintained. Many substrates useful as high performance materials have open-cell porosity, which can be measured as average pore volume. Because such porosity is important to the usefulness of such high performance materials (such as heat barriers), a coating that functions to protect the substrate against oxidative degradation, should not significantly affect the porous character of the substrate. Typically, there is less than 25% or less than 10% (preferably less than 2% and may be below 1%) change in pore volume after application of a coating of this invention. Thus, typically, 75% (on a volumetric basis), 90%, or more of measured porosity is retained based on an uncoated substrate. Preferably, at least 95% of the porosity is retained and porosity retention may be at least 98% or at least 99%. Thus, a superior internal coating is thin (typically less than 2 micrometers, preferably less than 1 micrometers, more preferably less than 0.5 micrometer) and is able to coat surfaces within pores of a substrate and protect all surfaces of a porous material against oxidative degradation at extreme operating conditions experienced by such substrate including temperature and moisture and contaminant concentrations.

As used in this invention, maintenance of porosity or weight gain after coating refers to the top segment of a porous material, which may be up to 5 mm thick. For example, a refractory material (e.g., a brick) may have porosity throughout a substantial body, but an environmental coating need only to penetrate a few millimeters into the body to provide protection. However, in many applications the porous substrate may be substantially thinner such as in TBC's and CMC's.

In another aspect of this invention, a high performance porous material containing open pores is internally coated with a continuous layer of a phosphorus-containing alumina according to this invention to an extent that open or interconnected porosity of the coated substrate is at least 90%, preferably at least 95% and typically at least 98% or more, of the porosity of an uncoated substrate.

In another aspect of this invention, larger interior spaces within a substrate that are accessible only by smaller channels (e.g., mesopore size channels) may be coated with one or more layers of phosphorus-containing alumina. This is in contrast with conventional coating systems in which such large interior spaces could not be reached by an external coating.

In some uses of this invention, a substrate may contain large open surface pits or cracks that could be coated with an external coating, but smaller mesopores or macropores connected to such pits or cracks would not be coated in a conventional system, but these smaller open pores and channels may be coated internally using this invention.

In an aspect of the invention, multiple layers of phospho-alumina are deposited on internal surfaces of a porous substrate. Creation of such layers is a result of multiple treatments of the precursor solution, preferably under pressure differential (preferably vacuum) conditions. Although observation of separate layers in the internal structure is difficult, the thickness of the resulting deposited material increases as the number of layers increase in some areas of the pore structure. As used in this invention, a layer is the resulting deposit of a phospho-alumina precursor solution under the conditions described in this invention. Due to the irregular surfaces within a porous substrate, multiple deposits of phospho-alumina layers may not form a uniform layer structure. In some aspects of this invention, each deposited sublayer may occupy the same areas, different areas, or a combination thereof of the total open porosity surface area.

In a further aspect of this invention the internal coating of a porous material remains stable up to 800° C. and preferably up to 1000° C. or more. That is, the internal coating retains compositional integrity and remains crack-free at elevated temperatures. However, in some uses materials of this invention may not be used at high temperatures or under extreme environmental conditions.

An aspect of this invention is coating interior surfaces of an open porous material such that environmental contaminants cannot penetrate through size constrictions in open channels and preserve interior porosity and thermal conductivity properties. The number of sublayers of the phospho-alumina applied in accordance with this invention may be optimized to form a suitable porous structure protected from environmental attack but preserving desired physical properties.

Another aspect of this invention is to enable partial or full coating or blockage of very fine (e.g. mesopores) pore channels (<50 nm) by repetitive coating application that allows for preferential percolation of the chemical solution precursor into the pores. In a preferable aspect of this invention substantially all (and typically more than 98%) pores having mean diameters less than 50 nm (and typically less than 30 nm) are coated or blocked by a phosphorus-containing alumina material. Repeated internal coatings of this invention may form a fluid (gas or liquid) diffusion barrier through filling pore or channel constriction points in the porous material. Creating such a constricted, filled barrier may not be uniform throughout (i.e., may be mostly present near the surface of the substrate, e.g., top ~200 μm) the substrate, but will be sufficient to form a functional diffusion barrier.

A further aspect of the invention is to use a chemical precursor solution that preferentially wets the pore walls and yields a dense coating that serves as an effective diffusion barrier along the pore walls and also imparts resistance against sintering or grain growth. Also, the coating provides moisture resistance.

A further additional aspect of this invention is to enable deposition of predominantly alumina coatings on pore walls by use of specialized formulations, whereby phosphorous content is added to improve film forming or wetting characteristics of the coating material.

An additional aspect of the invention is to enable deep penetration of the phospho-alumina coating into the substrate such that any erosion or abrasion of substrate surfaces during service or use (such as in turbine shrouds rubbing against blades in gas turbine engines) will not eliminate protection, which will be preserved based on the internal coating deep within the porous substrate.

Another aspect of the invention is to improve or enhance mechanical strengths of substrate materials and their reliability through sealing of internal flaws induced during processing, such as in refractory linings, advanced ceramic monoliths (e.g., silicon carbide, silicon nitride, mullite, alumina, and combinations thereof), ceramic coatings, and ceramic matrix composites. This invention also may be used in pack diffusion based coatings; monolithic ceramics; metal fiber composites and mesh; metallic/ceramic foam or scaffold materials; ceramic, metallic, glassy, or organic micropores; microballoons, microbubbles, microporous insulation, including porous silica and alumina/garnet based gel materials; and ceramic, metallic, glassy/semi-polymeric composites.

A material with open porosity may not necessarily be permeable to fluids. Another aspect of this invention is sealing or decreased permeation of fluids (liquids and gases) through porous materials that have been coated internally according to this invention. Such fluids include molten salts, organic media, jet fuels, water vapor, air, oxygen, carbon monoxide, hydrogen, fuel contaminant vapors, and other species typically found in fuel or coal combustion environments.

An aspect of this invention is an interior-coated open porous material formed by contacting the porous material with a non-colloidal, low-viscosity liquid coating precursor that allows permeation of the liquid into the open pores and channels of the material. It is believed that infiltration of the non-colloidal, low-viscosity liquid coating precursor forms a liquid film onto the interior walls of the porous substrate, which may be 5 nm to 250 nm (preferably 10 to 100 nm) thick. Preferably, such low viscosity precursor solution also has a high concentration of phosphorus-containing alumina material. Thus, the solution will yield a greater amount of solids after drying and curing. This high solids yield precursor solution minimizes the number of repetitive applications of the solution, which reduces processing costs and potential risks associated with part/component rejection for these expensive advanced materials. Such solids yields typically range from at least 100 g/L (i.e. will produce at least 10 wt % solids based on the precursor solution) and may range to 300 g/L or above for alumina coating compositions. Preferably, such a high solids yield solution has a low viscosity of less than 100 cSt, typically less than 50 cSt, more typically less than 30 cSt, and more preferably less than 20 cSt.

The pores are in open communication with the exterior surface of the material. In this invention, preferably liquid precursor is infiltrated into the interior pore and channel system. Typically, a method of application of the liquid precursor may be brushing, flowing, dipping, or spraying followed by application of an exterior gas pressure to form a pressure differential between the exterior of the material and the interior pore and channel system. A preferable method of providing such a pressure differential is to evacuate the porous material before applying liquid precursor to the surface of the material and then repressurizing the material. This will force liquid precursor into the interior pores and channels to form a thin layer of such liquid precursor onto the interior surfaces of the porous materials. Alternatively, a porous material to which liquid precursor has been applied may be externally pressurized to form a pressure differential which forces the liquid precursor into the interior pore and channel system. Typically, a suitable pressure differential is about one bar, although higher or lower exterior pressures may be used. An inert gas may be used to flush out residual oxygen in a porous material. In a vacuum-assisted application method to produce an interior coating of precursor, a porous material or an article which has an exterior porous material substrate, typically, may be evacuated to vacuum pressures of below 20 kPa (0.2 bar), typically below 10 kPa, and may be below 1 kPa. Typically, a porous material or article is put under vacuum for a time period sufficient to remove trapped air to the level of the vacuum. Such time period may be up to an hour or more, but typically is at least 5 to 30 minutes.

In another aspect of an infiltration method of this invention, liquid precursor is allowed to flow into pore openings of a porous substrate by maintaining a continuous liquid contact of the surface of the porous material such that liquid precursor migrates into the pore system to form an interior liquid film onto the surface of the interior pores and channels. In this method a porous material may be immersed or bathed in liquid precursor such that some or all of the pore openings on the surface remain covered by liquid precursor for a time sufficient for such migration. In another method, liquid precursor is sprayed continuously or semi-continuously onto a surface of a porous material such that some or all of the pore openings on the surface remain covered by liquid precursor for a time sufficient for liquid precursor migration into the pore structure. Also, continuous contact of liquid precursor to a porous surface may be performed by maintaining such contact with a saturated cloth, sponge, or similar material for a sufficient time for liquid migration into the pore structure. Typically, immersion or continuous contact of the surface with liquid precursor of at least about 5 minutes, typically at least 10-15 minutes, and may be at 20 minutes or longer in needed to permit such migration. Such continuous contact is distinct from mere brushing, flowing, dipping, or spraying of a liquid onto a surface in which there is insufficient time to permit liquid migration into the interior pore structure.

Layers of phosphorus-enriched aluminas or phospho-aluminas used in this invention may be made typically by forming a sol-gel containing oxides of aluminum to which oxides of phosphorus are incorporated, which is cured by heating to a temperature sufficient to form a phospho-alumina. These coating precursor materials typically are formed in a non-aqueous liquid such as an alcohol and not under strong acid conditions (pH>2). A typical low viscosity, non-colloidal (i.e., clear, non-cloudy) solution of precursor material useful in this invention is formed by combining an aluminum salt in alcoholic solution with an alcoholic solution of a phosphate ester or precursor of a phosphate ester. A typically suitable alcohol solvent is a $C_1$-$C_4$ monohydroxy alcohol including methanol, ethanol, n-propanol, iso-propanol, n-butanol, 2-butanol, and t-butanol and combinations thereof. Methanol, ethanol, or combinations thereof are preferred. In a typical procedure, alcohol solutions of an aluminum salt (such as aluminum nitrate or aluminum acetate) and a phosphorus oxide such as phosphorus pentoxide ($P_2O_5$) or phosphorus oxide ester are combined in aluminum to phosphorus atomic ratios suitable for creating a desired layer of material. It is believed that an alcohol solution of a phosphorus pentoxide results in an ester of a phosphorus oxide or phosphate. Preferably, the liquid precursor is a non-colloidal solution of the phospho-alumina precursor in an alcohol solvent. Preferably, concentration of a phospho-alumina precursor liquid is at least about 1 molar (M) and typically is 1.5 M or above and may range up to 3 M or above wherein molarity/concentration is the number of moles of Al per liter of solution. A typical phospho-alumina precursor is 1 to 2.75 M and preferably 1.5 to 2.5 M. Use of lower phospho-alumina precursor concentrations (e.g., >0.3 M) typically requires additional coatings, which may be inefficient. Preferably, the coating materials are halide free. Examples of phosphorus-alumina coating systems are described in U.S. Pat. Nos. 6,036,762; 6,461,415; 7,311,944; 7,678,465; 7,682,700, all incorporated by reference herein.

A typically useful phospho-alumina precursor coating solution has an aluminum to phosphorus atomic ratio at least 0.5:1 and may range up to 20:1, or above. Typical phospho-alumina precursors have an aluminum-to-phosphorus atomic ratio at least 1:1 and usually at least 2:1, and preferably at least 4:1. Such typical precursors may have an aluminum-to-phosphorus atomic ratio up to 15:1 and preferably up to 10:1.

The principal structural components of the phospho-alumina precursor solutions useful for the layers used in this invention appear to be complexes that contain Al—O—Al linkages. From analysis of $^{27}$Al and $^{31}$P NMR data, the internal structure of the precursor materials is such that [$PO_4$] groups appear to be linked to [$AlO_4$] groups, which in turn are linked to [$AlO_6$] groups. Thus, these materials contain tetrahedral aluminum coordination together with "distorted" octahedral aluminum, the intensity of which distortion increases with increases in excess aluminum content. This is unlike exclusive tetrahedral coordination for aluminum observed in crystalline polymorphs of $AlPO_4$.

Typical phospho-aluminas useful in this invention may contain Al—O—Al linkages and may contain [$PO_4$] tetrahedra groups linked to [$AlO_4$] tetrahedra groups, which in turn are linked to [$AlO_6$] octahedral groups. These phospho-aluminas therefore are distinct from aluminophosphate polymorphs that exist in tetrahedral coordination.

Phospho-aluminas, or otherwise described as phosphorus-enriched or phosphorus-containing aluminas, in which the Al/P atomic ratio is less than about 12, typically less than about 10, usually less than about 8, useful in this invention typically are substantially amorphous and such amorphous character may be determined by X-ray diffraction (XRD) spectra. A substantially amorphous material does not exhibit specific XRD peaks, which can be attributed to lattice parameters of a crystalline structure. Typically, phosphorus-enriched aluminas in which the Al/P atomic ratio is more than 6 may convert partially or fully to crystalline alumina polymorphs upon high temperature exposures over long term. Despite this transformation, in the case of CMAS attack, the partially or fully transformed alumina will remain effective as a sacrificial layer to arrest CMAS flow and further TBC degradation.

A liquid coating precursor suitable for use in this invention should have a viscosity sufficiently low to permit permeation (i.e., near complete infiltration) of the liquid into the interior pore and channel system under the pressure differential conditions used. Typically, the liquid precursor is an alcohol solution, such as methanol or ethanol, and has a kinematic viscosity of below 150 centistokes (cSt), usually below 100 CSt, typically below 60 cSt preferably below 50 cSt, below 30 cSt or below 20 cSt. A preferable solution contains methanol and has a viscosity below 35 cSt. The low viscosity liquid should have low surface tension to facilitate infiltration into fine channels and pores. Typically, viscosity may be measured according to ASTM D446.

In accordance with this invention, one or more layers of a modified alumina material are deposited upon the side surfaces of interior channels of a porous substrate. Preferably, the side surfaces of the channels are coated without blocking or filling channels having diameters of more than 30-50 nm. Thus, most of the channels are open and are in open communication with the surface. This retains properties of the porous substrate such as thermal barrier protection and stress fracture resistance.

Typically, each sublayer is 1 to 50 nm thick, such that as layers are built up, small mesopores (e.g. 30 nm or less in average diameter) channels may be completely filled may be blocked at narrow channel constrictions. However, the remaining coated channels have a pore volume sufficient to maintain beneficial properties of the porous material. Depending on the application an internal coating layer of this invention typically is at least 5 nm (usually at least 10 nm or at least 20 nm) and may be up to 500 nm, preferably up to 300 nm, and typically up to 100 nm thick. A typical thickness range for an internal coating layer (including sublayers) is 10 to 300 nm.

Application of multiple sublayers of phospho-alumina in accordance with this invention is preferable to form an advantageous conformal interior protective coating layer within a porous material. Typically, at least two coating applications are used and many times up to ten to twenty sublayers or more of phospho-alumina composition may be used. Typical useful applications use two to five sublayers of phospho-alumina composition. In order to form a sublayer, the open porous material is treated as described by applying a low viscosity liquid precursor to the material exterior followed by a pressure differential treatment. After the liquid precursor has formed an interior surface coating within the porous material, the material is dried and cured to form a phospho-alumina sublayer. This process may be repeated to form multiple sublayers of phospho-alumina composition. Although multiple sublayers may improve protective properties, application of multiple sublayers will fill the open pore and channel system, which may affect some physical or mechanical properties of the material; however, typically the total weight gain from coating application within the pores is less than 10 wt. % and typically is less than 5 wt. % and may be less than 2 wt. %. Typically, two to five sublayers will be sufficient to form a protective layer without significantly affecting desired mechanical properties. Sublayers of phospho-alumina composition useful in this invention may have different Al/P ratios.

A particular advantage of multiple layer application is to allow percolation of coating liquid into extremely fine pore channels. Although two repetitive cycles of coating application does not appear to infiltrate very fine channels (which typically are less than 50 nm and may be less than 30 nm), five layers of coating appear to fill the very fine channels completely as indicated by transmission electron microscopy for the columnar pore channels in a TBC coating. Without wishing to be bound by any theory, it is postulated that percolation of low-viscosity liquid precursor coating solution upon multiple applications of coating solution restricts segments in larger pore channels until sufficient internal pressure is obtained to force such coating liquid into the very fine channels. This effect may be based on the fact that pore channel sizes are not uniform in the porous body. For example, a pore channel may have a maximum 2-micrometer diameter in many segments of the channel, but may contain constrictions of less than 100 nm in certain locations. This is typical, for example, in polymer infiltrate pyrolysis (PIP) used in fabrication of ceramic matrix composites. Upon multiple infiltrations of the coating solution, the "constriction" points within a pore channel (such as in the 100 nm constrictions in the example above) are further reduced, which fundamentally alters the percolation of the precursor coating solution during a subsequent infiltration step. The presence of such constrictions during a subsequent infiltration results in increased internal pressure at the entrance of such fine channels, which directs infiltration of the coating solution into the fine channels. This effect particularly is useful if the very fine channels are primarily responsible for the property or properties of interest of the material in service, such as hot corrosion degradation, because of the higher surface area per volume of such very fine channels. This type of degradation occurs in atmospheric plasma sprayed (APS) TBC coatings. However, the invention is applicable to ceramic coatings produced by other techniques, including but not limited to, vacuum plasma spray (VPS), High Velocity Oxy Fuel (HVOF), and electron beam physical vapor deposition (EBPVD).

Coverage of internal structures of porous materials with phosphorus-containing alumina described in this invention typically may be observed using scanning electron microscopy (SEM) or transmission electron microscopy (TEM) with representative samples of such materials.

An aspect of this invention is a porous substrate in which macropores are internally coated, and mesopores are substantially (e.g. >50%) filled or blocked, with phosphorus-containing alumina described in this invention. In some aspects, constrictions within the pore and channel system in the porous substrate are blocked, which transforms an open pore system into a partially closed pore system. Because much of the pore structure remains, the density of the porous substrate may not change significantly (<10%, typically <5%, preferably <1%) after application of internal coating. This may be observed by measuring weight gain (or density) of a porous substrate after internal coating in accordance with this invention.

The application of a phosphorus-containing alumina coating of this invention in some applications may be repeated multiple times, until the mesopore porosity of the TBC system is reduced to less than 5%, representing more than 20 applications of the phospho-alumina coating. The goal of applying the coating using this approach of combining a thermally stable amorphous phospho-alumina coating material made from a low viscosity precursor and a infiltration coating process targeted at specific internal substrate pore sizes is to use an infiltration process repeatedly to apply the coating material in a stepwise fashion of successive layers until the substrate's fine pore channels/structures are lined with the coating material or nearly filled with the coating material, without significant impact to the inherent strain tolerance or density of the substrate, with curing or setting of the coating done between each layer for coating stability purposes.

In some applications of this invention a porous material (e.g., fused silica or silicon nitride) is treated multiple times such that pore or channel constrictions within the substrate are effectively blocked such that fluid (liquid or gas) permeation through the substrate is blocked, although the substrate material may continue to have a degree of open porosity. In such applications, the amount of remaining open porosity after treatment according to this invention typically may be at least 30%, 40% or 50% of an untreated substrate.

In some typical uses of this invention, a porous material is bonded to another substrate material to form a composite or laminated structure. The exterior porous material may act as a protective structure to the underlying substrate. Typical underlying substrates are metals and bonded porous materials are oxides. A bondcoat may be applied between a metal substrate and a porous substrate. In this invention, the internally coated porous substrate material will protect the underlying material from environmental attack such as oxidation. Thermally grown oxide (TGO), present underneath TBC coatings, formed from oxidation of underlying bondcoat alloys can induce interfacial stresses that leads to delamination or TBC failure. This is further exasperated by interface roughening or rumpling of TGO as it grows. Reduction in TGO scale growth or scale of roughening would extend the life of a turbine component coated with such a TBC. Thus, in general, oxidation of metal or metallic alloy having a ceramic coating can be subject to such stresses and subsequent cracking/failure. Internal coatings, such as described in this invention, can reduce the oxidation rate and thereby provide enhanced protection. The exterior porous material may be of any suitable thickness, which provides an adequate protective layer to the underlying substrate. Typical thermal barrier coatings are 0.1 to 2 millimeters, although the porous material may be thinner or thicker depending upon specific use.

The composition of the advanced high performance materials useful in applications of this invention is chosen based on the functional need required of the material, but is most strongly influenced by the environmental conditions described above and the ability of the material to withstand the environment. For example, carbon is an excellent thermal material for heat management applications, because carbon can conduct large quantities of heat for removal in large thermal load applications. However, because carbon is susceptible to extremely rapid oxidation, carbon is not useful in oxidizing environments and cannot be used in pure form. Other materials substituted for carbon in high temperature oxidizing conditions typically are heavier, not as good thermal conductors, and not as easy to form or machine as pure carbon (such as graphite). Thus, additional substituted material is required to meet the functional effectiveness of carbon, which impacts cost and weight restrictions. Use of an interior coating as described in this invention preserves the physical and mechanical properties of a material (such as thermal conductivity) without significant impact on weight.

A preferable interior layer (which may have more than one sublayers) of phospho-alumina within a porous material in this invention conforms to the interior surfaces of the material. The phospho-alumina is continuous throughout the interior surface and is substantially crack free to the extent that the underlying substrate material (such as a metal) is not exposed to harsh environmental conditions during use. The phospho-alumina layer has low oxygen permeability and thus functions as an oxidation protection barrier. Further, this layer is a barrier to chemical reactions that cause corrosion of the porous material and underlying substrates.

In a method of this invention, a sol-gel composition containing oxides of aluminum and phosphorus is dried typically at a mild elevated temperature (usually 60 to 200° C.) or reduced pressure to remove volatile organics, and then cured by heating to at least the melting temperature of the resulting mixture for a time sufficient to form a flowable fluid. Such fluid state may form a film or layer within the internal pores of a substrate having a substantially uniform (typically <10% variation) phospho-alumina composition throughout the sublayer and which layers conform to the internal surfaces of the pores. Typical curing temperatures useful in this invention are at least 350° C., usually above 400° C. and preferably above 500° C. and may range up to 900° C. or more. A suitable curing temperature is below the disintegration temperature of the materials. A suitable curing time may be a few minutes and typically may range from 5 minutes to up to 3 hours or more. Drying and curing may be conducted in one continuous step.

In another aspect of this invention, an aluminum-phosphorus precursor solution of this invention may be applied to a suitable substrate as described and dried, but not cured. Such a coated substrate may be incorporated into a component, which may be subject to high temperature conditions during service. If such conditions become higher than the melting temperature of the uncured coating, the coating will be transformed into a phospho-alumina as described in this invention, and will become a protective barrier coating to the substrate.

Illustrative examples of articles having porous surfaces, which may use this invention include, but are not limited to, thermal barrier coatings used on aircraft engine and power generation turbine blades, refractories used in applications such as metal processing; ceramic matrix composites such as based on carbon-carbon, carbon-silicon carbide, and silicon carbide-silicon-carbide composites; graphite; ceramic materials; and the like.

EXAMPLES

Aspects of the invention are illustrated but not limited by the following examples.
Precursor Solution A
A precursor solution was prepared by adding aluminum nitrate nonahydrate (GFS Chemicals, Powell, Ohio) to anhydrous ethanol (~375 g/liter). In a separate container, phosphorus pentoxide (Sigma Aldrich, St. Louis, Mo.) was dissolved in anhydrous ethanol (~284 g/l) and then the two solutions were combined and stirred under reflux conditions for 16 hours. The solution was concentrated in a rotary evaporator at 65° C. The resulting 116 g/liter phospho-alumina precursor solution had an aluminum to phosphorus atomic ratio of 10 to 1.
Precursor Solution B
A precursor solution was prepared in a manner similar to precursor solution A by adding aluminum nitrate nonahydrate to methanol (~375 g/liter). In a separate container, phosphorus pentoxide was dissolved in methanol (~284 g/l) and then the two solutions were combined and stirred under reflux conditions for 40 hours. The solution was concentrated on a rotary evaporator at 65° C. The resulting 181.9 g/L phospho-alumina precursor solution had an aluminum to phosphorus atomic ratio of 1.5 to 1.

Example 1

A thermal barrier coating (TBC) on a substrate consisting of a nickel-based superalloy coupon substrate with an overlying NiCrAlY bondcoat layer and a top plasma spray coating of yttria-stabilized zirconia (Praxair Surface Technology) was coated with precursor solution A. The TBC zirconia topcoat porosity was measured by Archimedes' method to be in the range of 10%-20% before applying the precursor solution. A coating on the external surface and internal open pore wall surfaces was applied using vacuum assisted infiltration of precursor solution A. The TBC substrate first was cleaned by immersing in acetone and alcohol while ultrasonicating for at least 10 minutes each, followed by drying in air at 120° C. for 30 minutes. The substrate was placed in a glass beaker and placed in a vacuum chamber, which was evacuated to a pressure in the range of 1-20 torr (0.1-3 kPa) to, with a dwell time under full vacuum of 5 minutes. The coating precursor solution was introduced into the vacuum chamber and directed into the beaker holding the TBC substrate through a delivery line. The TBC sample then was allowed to soak while completely submerged under the level of the coating precursor liquid for about 30 minutes, while still under (passive) vacuum, such that the system pressure was allowed to rise naturally as the alcoholic precursor solution evaporated. The TBC substrate was removed from the vacuum chamber and the solution container, and dried at 120° C. for 30 minutes. Subsequently, the substrate sample was directly inserted into a furnace set at 500° C. in air and allowed to dwell for 45 minutes to facilitate the curing of the aluminum phosphate coating.

Example 2

Coated TBC samples of Example 1 were characterized using electron microscopic methods of the TBC substrates prepared by fracturing the TBC along a plane that was oblique to the TBC topcoat thickness, which allowed direct observation of the aluminum phosphate coating within the TBC porosity. Scanning electron microscopy (SEM) and transmission electron microscopy (TEM) were used to confirm that the coating was well-adhered to the internal TBC pore surfaces and to show the presence, continuous coverage, high density, amorphous structure, and hermetic nature of the phospho-alumina coating. Pore sizes in the YSZ TBC system substrate were in three distinct ranges: 4 nm-20 nm mean pore diameter (as defined by TEM instrument resolution), 20 nm to 100 nm, and 100 nm to 2 mm. The phospho-alumina coating material was confirmed substantially to be present in the pores in size ranges of 4 nm to 100 nm mean pore diameter and 100 nm to 1000 nm.

Example 3

Phospho-alumina coated TBC samples similar to those of Example 1 (infiltrated 2 times (2×) and 5 times (5×)) were annealed at 1300° C. for 1 hour in air in a tube furnace under atmospheric conditions with a 30 mg Calcium Magnesium Aluminum Silicate (CMAS) pellet sitting on top of each sample. The CMAS was prepared as a powder by combining the oxide powders of calcium (35 weight %), magnesium (10 weight %), aluminum (7 weight %), and silicon (48 weight %) that was pressed into a pellet. An uncoated TBC sample with a 30 mg CMAS pellet on top also was included for exposure as a control.

After annealing, a significant increase in resistance to attack and corrosion of the TBC by the CMAS material was noted for the phospho-alumina coated samples, as measured by the lack of infiltration of the CMAS into the TBC porosity. In addition, spallation of the zirconia topcoat after the CMAS exposure for the uncoated TBC, along with general densification of the microstructure of the uncoated TBC as compared to the post-exposure status of the coated samples of Example 3, indicated an increased degree of CMAS attack for the uncoated TBC sample compared to the coated samples. Thus, the mitigation of CMAS attack for the coated samples was a result of localized presence of "alumina" on internal pore walls.

While both the 2× infiltration and 5× infiltration phospho-alumina coated samples showed increased resistance to CMAS attack compared to the uncoated TBC sample, the performance of the 5× infiltration sample was superior based on the depth and degree of molten CMAS attack. This may be due to the local protection provided by the infiltration of the finest TBC porosity (4-100 nm) that occurs for the 5× infiltration sample but not the 2× infiltration sample.

Example 4

Phospho-alumina coated TBC samples with two different YSZ architectures were prepared according to Example 1, but with 1× and 2× coating process runs. Thermal exposures were performed with the samples in air from room temperature to 1121° C. in a cyclic fashion in a vertically aligned tube furnace with a pulley assembly, with dwell times of 15 minutes and 45 minutes at each temperature, respectively. The primary purpose of this experiment was to demonstrate retention of strain tolerance of the TBC coating. The thermal exposures were designed to induce mechanical failure within the coating layers of the TBC samples; the mechanism and time to failure should be a direct indicator of the strain tolerance of the TBC. Several uncoated TBC samples of identical architecture as the coated samples were included in the thermal exposure for reference. Thermally induced mechanical failure of the TBC ceramic topcoat (i.e., loss of adhesion) was observed to occur at 139 thermal cycles for the uncoated and an average of 137 thermal cycles for the phospho-alumina coated samples for the first YSZ architectural variant samples, and no failure was observed after an average of 777 thermal cycles for both uncoated and phospho-alumina coated samples for the second YSZ architectural variant. The predominant failure mechanism for the first architectural variant sample was related to ceramic topcoat stiffening for the uncoated sample, which was in contrast to the phospho-alumina coated samples failure mechanism being related to de-adherence of the thermally grown oxide layer underlying the ceramic topcoat layer. These data show that the application of the coating does not reduce the strain tolerance and potentially improves TBC performance due to enhanced sintering resistance.

Example 5

Four samples of ceramic matrix composites (CMC) substrates consisting of a silicon carbonitride matrix with silicon carbide fibers were coated: Substrate 1 was coated with precursor solution B (181.9 g/L, 14.2 cSt); Substrate 2 was processed with a similar precursor solution (103 g/L, 15 cSt; Al:P 4:1) with a lower yield and similar viscosity to precursor solution B; Substrate 3 was coated with a similar, ethanol based-precursor solution (151 g/L, 34 cSt; Al:P 4:1) with a lower yield and higher viscosity compared to precursor solution B; and Substrate 4 was processed with a similar, ethanol based-precursor solution (188 g/L, 59.75 cSt; Al:P 4:1) with a higher yield and higher viscosity compared to precursor solution B. The CMC open porosity was measured prior to coating by Archimedes' method to be approximately 5% before applying the precursor solution. The coating was applied to the external and internal pore wall surfaces of each CMC sample using vacuum assisted infiltration. Each substrate was cleaned by immersion separately under acetone, methanol, and ethanol while ultrasonicating for 10 minutes each followed by a drying step at 120° C. in air for 30 minutes. The substrate was placed in a glass, graduated cylinder with a vacuum fitted cap with two ports for vacuum and the introduction of the precursor solution. A vacuum pump was used to evacuate the cylinder to a pressure of 5 to 20 torr. The graduated cylinder was filled with the precursor solution through the second port such the substrate was completely submerged. The CMC substrate was allowed to sit submerged in the precursor solution while under vacuum for approximately 1 minute. After infiltration, the vacuum was released and sample was removed from the graduated cylinder and dried in air at 120° C. for 30 minutes. Following the drying, the sample was placed in a furnace and ramped from room temperature to 550° C. at a rate of 10° C./minute. The sample was held at 550° C. for 1.5 hours to facilitate the curing of the aluminum phosphate coating and then cooled to room temperature at 10° C./minute. This process was repeated a total of 5 times for each substrate.

The coated CMC samples were subjected to environmental testing involving a 15-minute submersion in deionized water, followed by 24 hours in a humidity chamber at 90% relative humidity and 32° C. The weight of each sample was measured after removal from the humidity chamber to determine the amount of moisture absorbed. It is believed that limiting the access of moisture to the internal porosity of the material as indicated by the limited weight gain mitigates degradation of the porous substrate. The water submersion and humidity chamber steps were followed by 8 hours in an oven at about 800° C. with a heating and cooling rate of 10° C./minute. This 3-step exposure was repeated 8-times and an uncoated CMC sample also was included as a control. Following completion of the 8-cycle exposure, the ultimate tensile strengths of the samples were measured according to ASTM C1275. The percent decrease in tensile strength of the samples following the accelerated environmental exposure as compared to the uncoated, as-received material are shown along with the moisture weight gain in Table 1. The data in Table 1 indicate that the coating is mitigating the CMC degradation.

TABLE 1

| Sample[1] | Precursor Solution Yield (g/L) | Precursor Solution Viscosity (cSt) | Weight Gain (%)[2] | Tensile Strength Decrease (%)[3] |
|---|---|---|---|---|
| Uncoated CMC | | | 1.3 | 59 |
| Substrate 1 | 181.9 | 14.2 | 0.3 | 3 |
| Substrate 2 | 103 | 15.0 | 0.5 | 22 |
| Substrate 3 | 151 | 34.0 | 0.7 | 56 |
| Substrate 4 | 188 | 59.8 | 1.0 | 50 |

[1]After 8-cycle environmental exposure
[2]Weight gain after liquid water submersion and humidity chamber steps
[3]Decrease in tensile strength versus uncoated "as-received" sample.

Example 6

Phospho-alumina coated TBC samples were prepared according to Example 1, but with two independent 1× coating process runs with different Al/P ratios. The coated samples together with two uncoated samples of identical architecture were subjected to a thermal exposure test by heating in air at 1100° C. for a cumulative total of 338 hours at that temperature. Periodically, during the thermal exposure, the samples were cooled at a rate slower than 10° C./min until they reached room temperature and weighed and, thereafter, reheated to 1100° C. at a rate of 10° C./min. Weights were measured at 1, 3, 6, 8, 13, and 17 days during the thermal exposure test. The thermal exposure test was designed to induce mechanical failure within the coating layers of the TBC samples by oxidation of the metallic layer underneath the ceramic topcoat. Oxide scale thickening and lengthening rates are a direct indicator of the oxidation resistance of the TBC system. Oxidation induced mechanical failure of the TBC ceramic topcoat (loss of adhesion) was observed to occur after 266 hours for one of the uncoated samples, while the other uncoated and the phospho-alumina coated samples remained intact for the remainder of the 338 hour exposure. Oxide scale growth rate was measured as a function of weight gain per unit surface area per unit time and referenced to the original sample weight per surface area to yield a percent weight change over time. Results of the thermal exposure tests are shown in Table 2. These data show that application of the 1× phospho-alumina coating with an Al/P ratio of 2 substantially decreased the overall oxide scale formation rate of the metal substrate below the TBC topcoat. This indicates that the coating has penetrated the porous TBC and created a barrier against oxygen on or near the metal surface. Additional treatments (up to 5×) may result in further enhancement of protection against oxidation or environmental protection against other gaseous species.

TABLE 2

| Sample | Coating Al/P | Weight Change (%) | Rate of Weight Change (%/hour × 10⁴) |
|---|---|---|---|
| Example 6A | 6 | 27 | 4.8 |
| Example 6B | 2 | 21 | 2.9 |
| Uncoated Run A | — | (1) | (1) |
| Uncoated Run B | — | 34 | 5.6 |

(1) Spalled after 266 hours

Precursor Solution C

A precursor solution was prepared in a manner similar to precursor solution A by adding aluminum nitrate nonahydrate to anhydrous ethanol (~375 g/liter). In a separate container, phosphorus pentoxide was dissolved in anhydrous ethanol (~284 g/liter) in an inert atmosphere glove box and then the two solutions were combined and stirred under reflux conditions for 16 hours. The solution was concentrated on a rotary evaporator at 65° C. The resulting 173 g/L phospho-alumina precursor solution had an aluminum to phosphorus atomic ratio of 2 to 1.

Precursor Solution D

A precursor solution was prepared in a manner similar to precursor solution A by adding aluminum nitrate nonahydrate to anhydrous ethanol (~375 g/liter). In a separate container, phosphorus pentoxide was dissolved in anhydrous ethanol (~284 g/liter) in an inert atmosphere glove box and then the two solutions were combined and stirred under reflux conditions for 16 hours. The solution was concentrated on a rotary evaporator at 65° C. The resulting 4.0 molar (346 g/L) phospho-alumina precursor solution had an aluminum to phosphorus atomic ratio of 2 to 1.

Precursor Solution E

A precursor solution was prepared in a manner similar to precursor solution A by adding aluminum nitrate nonahydrate to anhydrous ethanol (~375 g/liter). In a separate container, phosphorus pentoxide was dissolved in anhydrous ethanol (~284 g/liter) in an inert atmosphere glove box and then the two solutions were combined and stirred under reflux conditions for 40 hours. The solution was concentrated on a rotary evaporator at 65° C. The resulting 1.0 molar (86.5 g/L) phospho-alumina precursor solution had an aluminum to phosphorus atomic ratio of 2 to 1.

Precursor Solution F

A precursor solution was prepared in a manner similar to precursor solution A by adding aluminum nitrate nonahydrate to anhydrous ethanol (~374 g/liter). In a separate container, phosphorus pentoxide was dissolved in anhydrous ethanol (~284 g/liter) in an inert atmosphere glove box and then the two solutions were combined and stirred under reflux conditions for 40 hours. The solution was concentrated on a rotary evaporator at 65° C. The resulting 2.5 molar (246 g/L) phospho-alumina precursor solution had an aluminum to phosphorus atomic ratio of 1.5 to 1.

Precursor Solution G

A precursor solution was prepared in a manner similar to precursor solution A by adding aluminum nitrate nonahydrate to anhydrous ethanol (~375 g/liter). In a separate container, phosphorus pentoxide was dissolved in anhydrous ethanol (~284 g/liter) and then the two solutions were combined and stirred under reflux conditions for 40 hours. The solution was concentrated on a rotary evaporator at 65° C. The resulting 300 g/L phospho-alumina precursor solution had an aluminum to phosphorus atomic ratio of 1 to 1 and a viscosity of 59 cSt.

Example 7

A coupon of slip cast fused silica (SCFS) was coated with precursor solution C. The SCFS open porosity was measured by He gas pycnometry to be in the range of 14%-16% before applying the precursor solution. A coating on the external surface and internal open pore wall surfaces was applied using vacuum assisted infiltration of the precursor solution C. The SCFS substrate first was cleaned by immersing in acetone and alcohol while ultrasonicating for at least 10 minutes each, followed by drying in air at 120° C. for 30 minutes. The substrate was placed in a glass beaker and placed in a vacuum chamber, which was evacuated to a pressure in the range of 0.1-20 torr (0.01-3 kPa) to, with a dwell time under full vacuum of 5 minutes. Subsequently, the coating precursor solution C was introduced into the vacuum chamber and directed into the beaker holding the SCFS substrate through a delivery line. The SCFS sample then was allowed to soak while completely submerged under the level of the coating precursor liquid for about 60 minutes, while still under (passive) vacuum, such that the system pressure was allowed to rise naturally while some alcohol from the precursor solution evaporated. The SCFS substrate was removed from the vacuum chamber and the solution container, and dried at 60° C. for 30 minutes and then 120° C. for 30 minutes. Subsequently, the substrate sample was inserted into a furnace and ramped to 600° C. and a rate of 10° C./min in air and allowed to dwell for 120 minutes to facilitate the curing of the aluminum phosphate coating. This procedure was repeated a total of four times with the first three with precursor solution C and finally using precursor solution D. After completion of four cycles, open porosity was measured by He pycnometry to be 7.2%, i.e., a 50% decrease in open porosity compared to the original SCFS sample (measured from all external surfaces).

Example 8

A coupon of coated SCFC, made according to Example 7, was tested for flexural mechanical strength in accordance with ASTM D790. The uncoated and coated material exhibited average flexure strengths of 58 and 67 mPa, respectively. An additional coupon was made according to Example 7 and was tested for He gas permeability using a Veeco MS-170 He leak detector (Oneida Research Services, Whitesboro, N.Y.). The coated and uncoated material exhibited He leak rates of $3 \times 10^{-8}$ and $2.0 \times 10^{-5}$ atm·cc/sec, respectively.

Example 9

A coupon of slip cast fused silica (SCFS) was coated with precursor solution G. The SCFS sample was measured by calipers and an analytical balance to have a bulk density of 1.95 g/cc. The SCFS was additionally measured by He gas pycnometry and reported in Table 3 as open pores and closed pores (calculated by the bulk density). A coating on the external surface and internal open pore wall surfaces was applied using vacuum assisted infiltration of precursor solution G. The SCFS substrate first was cleaned by immersing in alcohol while ultrasonicating for at least 10 minutes each, followed by drying in air at 160° C. for 10 minutes and heating at 800° C. for 60 minutes. The substrate was dried at 160° C. and placed in a glass beaker and placed in a vacuum chamber, which was evacuated to a pressure in the range of 0.1-20 torr (0.01-3 kPa) to, with a dwell time under full vacuum of 10 minutes. The coating precursor solution was introduced into the vacuum chamber and directed into the beaker holding the SCFS substrate through a delivery line. The SCFS sample then was allowed to soak while completely submerged under the level of the coating precursor liquid for about 60 minutes, while still under vacuum, such that the system pressure was allowed to rise naturally while some of the alcohol from the precursor solution evaporated. The SCFS substrate was removed from the vacuum chamber and the solution container and patted dry with a Kimwipe™, and dried at 60° C. for 10 minutes and then 160° C. for 30 minutes. Subsequently, the substrate sample was inserted into a furnace and ramped to 800° C. and a rate of 10° C./min in air and allowed to dwell for 60 minutes to facilitate the curing of the aluminum phosphate coating. This procedure was repeated a total of five times with precursor solution G. After deposition of each layer, the SCFS porosity (vol. %) was measured by helium gas pycnometry and reported in Table 3 as open pores and closed pores (calculated by the bulk and powder density), together with the percent weight gain per layer. A leak rate for the material was determined by fastening the coupon to a vacuum chuck with crystal bond and attaching to a vacuum line equipped with a pressure gauge (Baratron™). The system was evacuated for 60 minutes and the system was sealed off with a valve such that a pressure of <5 torr was made between the sample and the pressure gauge. A leak/diffusion rate of air through the coupon was recorded over ten minutes. The leak rate of unsealed SCFS and compared to the sample above was 31.2 torr/min vs. 0.03 torr/min, respectively.

TABLE 3

| Layer | Open pores | Closed pores | % weight gain |
|---|---|---|---|
| Uncoated | 15% | 13% | N/A |
| 1 layer | 17% | 11% | 1.58% |
| 2 layers | 15% | 13% | 0.08% |
| 3 Layers | 15% | 13% | 0.07% |
| 4 Layers | 13% | 15% | 0.08% |
| 5 Layers | 0% | 28% | 0.01% |

Example 10

A coupon of reaction bonded silicon nitride (RBSN) was coated with precursor solution F. The RBSN open porosity was measured by Archimedes' method before applying the precursor solution to be 23%. A coating on the external surface and internal open pore wall surfaces was applied using vacuum assisted infiltration of the precursor solution C. The RBSN substrate first was cleaned by immersing in acetone and alcohol while ultrasonicating for at least 10 minutes each, followed by drying in air at 120° C. for 30 minutes. The substrate was placed in a glass beaker and placed in a vacuum chamber, which was evacuated to a pressure in the range of 0.1-20 torr (0.01-3 kPa) with a dwell time under full vacuum of 5 minutes. Subsequently, the coating precursor solution C was introduced into the vacuum chamber and directed into the beaker holding the RBSN substrate through a delivery line. The RBSN sample then was allowed to soak while completely submerged under the level of the coating precursor liquid for about 10 minutes, while still under (passive) vacuum, such that the system pressure was allowed to rise naturally while some alcohol from the precursor solution evaporated. The RBSN substrate was removed from the vacuum chamber and the solution container, and dried at 120° C. for 10 minutes. Subsequently, the substrate sample was inserted into a furnace and ramped to 500° C. and a rate of 10° C./min in air and allowed to dwell for 60 minutes to facilitate the curing of the aluminum phosphate coating. This procedure was repeated a total of five times. After completion of the five cycles the open porosity was measured by Archimedes' method to be 1%, thus a decrease in open porosity compared to the original RSBN sample.

Example 11

A coupon of coated RBSN, made according to Example 10, was tested for flexural mechanical strength in accordance with ASTM D790. The uncoated and coated material exhibited average flexure strengths of 103 and 128 mPa, respectively.

Precursor Solution H

A precursor solution was prepared in a manner similar to precursor solution A by adding aluminum nitrate nonahydrate to anhydrous ethanol (~375 g/liter). In a separate container, phosphorus pentoxide was dissolved in anhydrous ethanol (~284 g/liter) and then the two solutions were combined and stirred under reflux conditions for 40 hours. The solution was concentrated on a rotary evaporator at 65° C. The resulting 100 g/liter phospho-alumina precursor solution had an aluminum to phosphorus atomic ratio of 1.5 to 1 and a viscosity of 5.3 cSt.

Example 12

Samples of SCFS with bulk volumes of ~0.6-0.9 cc were chemically cleaned in ethanol in an ultrasonic bath and then further cleaned by heat treating at 800 C for 1 hour in a furnace. After the samples were dried in an oven at 160° C. for 10 minutes, the samples were immersed in Precursor Solution H for various times. The samples were removed from the solution and patted dry with a Kimwipe™ to remove excess solution. The samples were dried in an oven at 60° C. for 10 minutes and 160° C. for 10 minutes. Subsequently, the substrate sample was inserted into a furnace and ramped to 800° C. and a rate of 10° C./min in air and allowed to dwell for 60 minutes to facilitate the curing of the aluminum phosphate coating. The samples were weighed on an analytical balance and the percent weight gain was calculated. Table 4 displays the percent weight gains calculated for cured aluminum phosphate layer exhibiting the time dependence of the immersion process. The weight gains for 5 to 60 minutes do not show a statistical difference.

TABLE 4

| Immersion Time | % weight gain |
| --- | --- |
| 1 minute | 0.26% |
| 5 minutes | 0.45% |
| 10 minutes | 0.51% |
| 20 minutes | 0.47% |
| 60 minutes | 0.46% |

Example 13

Two samples of SCFS were chemically cleaned in ethanol in an ultrasonic bath and then further cleaned by heat-treating the samples at 800° C. for 1 hour in a furnace. The samples were dried in an oven at 160° C. for 10 minutes. One sample was immersed in Precursor Solution H for 1 minute and the other sample was immersed for 60 minutes. The samples were removed from the solution and patted dry with a Kimwipe™ to remove excess solution. The samples were dried in an oven at 60° C. for 10 minutes and 160° C. for 10 minutes. Subsequently, the substrate sample was inserted into a furnace and ramped to 800° C. and a rate of 10° C./min in air and allowed to dwell for 60 minutes to facilitate the curing of the aluminum phosphate coating. This procedure was repeated six times. A leak rate for the material was determined by fastening the coupon to a vacuum chuck and crystal bond and attaching to a vacuum line equipped with a Baratron™ pressure gauge. The system was evacuated for 60 minutes and the system was sealed off with a valve such that a pressure of <5 torr was made between the sample and the pressure gauge. A leak rate of air through the coupon was recorded over ten minutes. Uncoated SCFS 1-minute immersion and 60-minute immersion samples exhibited leak rates of 9.34 torr/min and 0.77 torr/min, respectively.

Example 14

One sample of SCFS was prepared in a similar fashion to Example 13 except the sample was suspended over a watch glass of solution such that only the face of the coupon was immersed in the solution. A beaker was placed over the apparatus to limit solvent evaporation. The sample was held for 60 minutes and the solution was allowed to infiltrate through the porous substrate. The coupon was cured as described in Example 13. This procedure was repeated six times. The sample was then tested for air permeability as described in Example 13. The leak rate was determined to be 1.65 torr/min.

Example 15

One sample of SCFS was prepared in a similar fashion to Example 13 except a saturated Kimwipe™ was placed on the surface of the coupon. A beaker was placed over the apparatus to limit solvent evaporation. The sample was held for 60 minutes and the solution was allowed to infiltrate through the porous substrate. The coupon was cured similarly to Example 13. This procedure was repeated six times. The sample was tested for air permeability as described in Example 13. The leak rate was determined to be 2.61 torr/min.

Precursor Solution J

A precursor solution was prepared in a manner similar to precursor solution A by adding aluminum nitrate nonahydrate to anhydrous ethanol (~375 g/liter). In a separate container, phosphorus pentoxide was dissolved in anhydrous ethanol (~284 g/liter) and then the two solutions were combined and stirred under reflux conditions for 40 hours. The solution was concentrated on a rotary evaporator at 65° C. and diluted to a concentration of 33 g/L. Erbium(III) nitrate pentahydrate (Sigma Aldrich, St. Louis, Mo.) was added to the solution with stirring until fully dissolved. The erbium-phospho-alumina precursor solution had an aluminum to phosphorus to erbium atomic ratio of 1 to 1 to 1.5 and a viscosity of 4 cSt.

Example 16

A coupon of slip cast fused silica (SCFS) was coated with precursor solution G. A coating on the external surface and internal open pore wall surfaces was applied using vacuum assisted infiltration of precursor solution J. The SCFS substrate first was cleaned by immersing in alcohol while ultrasonicating for 10 minutes, followed by drying in air at 160° C. for 10 minutes and heat cleaning at 800° C. for 60 minutes. The substrate was dried at 160° C. and placed in a glass beaker and placed in a vacuum chamber, which was evacuated to a pressure in the range of 0.1-20 torr (0.01-3 kPa) to, with a dwell time under full vacuum of 10 minutes. The coating precursor solution was introduced into the vacuum chamber and directed into the beaker holding the SCFS substrate through a delivery line. The SCFS sample then was allowed to soak while completely submerged under the level of the coating precursor liquid for about 60 minutes, while still under vacuum, such that some of the alcohol from the precursor solution evaporated. The SCFS substrate was removed from the vacuum chamber and the solution container and patted dry with a Kimwipe™, and dried at 60° C. for 10 minutes and then 160° C. for 10 minutes. Subsequently, the substrate sample was inserted into a furnace and ramped to 800° C. and a rate of 10° C./min in air and allowed to dwell for 30 minutes to facilitate the curing of the erbium-aluminum phosphate coating. The procedure was repeated an addition time with precursor solution G, which was diluted to 100 g/L (4 cSt).

Example 17

Coated SCFS sample of Example 16 was characterized using transmission electron microscopy (TEM) to confirm that the coating was well adhered to the internal SCFS pore surfaces and to show the presence continuous coverage, high density of the erbium-phospho-alumina coating. A TEM sample was extracted from the central portion of the sample by focused ion beam (FIB) milling. A conformal ~5 nm dense erbium-aluminum-phosphate coating was observed on a majority of the inner pore wall surfaces of pores ranging from 5-10 nm and on pore ranging 200-500 nm. Areas were observed in which aluminum-phosphate layer (not containing erbium) was observed as an additional layer of coating on top of the erbium-aluminum-phosphate coating. Additionally, pores of ~5-10 nm showed constrictions of fully dense erbium-aluminum-phosphate between the pore walls.

What is claimed:

1. A method of conformally coating pore walls of a porous inorganic substrate comprising:
providing a porous inorganic substrate;
forming a liquid film having a thickness of 5 to 250 nm on pore walls of the porous inorganic substrate, wherein the liquid film consists of a non-colloidal solution of a phospho-alumina precursor having an aluminum-to-phosphorous atomic ratio of 0.5:1 to 15:1;
drying the liquid film to yield a dried film; and then
curing the dried film to form a phosphorus-containing alumina sublayer having a thickness of 1 to 50 nm conformally coating the pore walls of the porous inorganic substrate;
and
wherein the conformally coated porous inorganic substrate has an open porosity that is at least 50% of an open porosity of the provided porous inorganic substrate.

2. The method of claim 1, wherein the liquid film comprises a non-colloidal solution of a phospho-alumina precursor carried in an alcohol solvent selected from the group consisting of methanol, ethanol, n-propanol, i-propanol, n-butanol, 2-butanol, t-butanol, and a mixture thereof.

3. The method of claim 1, further comprising providing the non-colloidal solution by admixing an aluminum salt solution and a phosphate ester solution, wherein the phospho-alumina precursor has a Al:P ratio of 4:1 to 15:1.

4. The method of claim 1, wherein the porous inorganic substrate carrying the conformal coating has a higher flexural mechanical strength than the same porous inorganic substrate without the conformal coating.

5. The method of claim 1, wherein the porous inorganic substrate is a ceramic thermal barrier coating.

6. The method of claim 1, wherein the porous inorganic substrate is a ceramic coating produced by an electron beam physical vapor deposition process.

7. The method of claim 1, wherein the porous inorganic substrate is a ceramic coating produced by a plasma spray process.

8. The method of claim 1, wherein the phosphorus-containing alumina sublayer has an aluminum-to-phosphorous atomic ratio of less than about 10.

9. The method of claim 1, wherein the phospho-alumina precursor has an aluminum-to-phosphorous atomic ratio of 4:1 to 15:1.

10. The method of claim 9, wherein the phosphorus-containing alumina sublayer has an aluminum-to-phosphorous atomic ratio less than 12:1.

11. The method of claim 1, wherein the phosphorus-containing alumina sublayer has an aluminum-to-phosphorous atomic ratio less than 12:1.

12. The method of claim 1, wherein the provided porous inorganic substrate includes mesopores that constitute 25% to 99.99% of a measured porosity.

13. A method of conformally coating pore walls of a porous inorganic substrate comprising:
providing a porous inorganic substrate;
a plurality of coating steps which provide a conformal coating consisting of two to five phosphorus-containing alumina sublayers carried on the pore walls of the provided porous inorganic substrate, the coating steps include
first forming a liquid film having a thickness of 5 to 250 nm on the pore walls of the provided porous inorganic substrate, wherein the liquid film comprises a non-colloidal solution of a phospho-alumina precursor having an Al:P ratio of 0.5:1 to 15:1; drying the liquid film; and then curing the dried film to provide a first phosphorus-containing alumina sublayer, where the phosphorus-containing alumina sublayer has a thickness of 1 to 50 nm; then
forming a liquid film having a thickness of 5 to 250 nm on the first phosphorus-containing alumina sublayer, wherein the liquid film comprises a non-colloidal solution of a phospho-alumina precursor having an Al:P ratio of 0.5:1 to 15:1; drying the liquid film; and then curing the dried film to provide a second phosphorous-containing alumina sublayer having a thickness of 1 to 50 nm;
wherein the conformally coated porous inorganic substrate has a remaining open porosity of at least 50% and a remaining volumetric porosity of at least 90%;
wherein each phosphorus-containing alumina sublayer has an aluminum-to-phosphorous ratio of less than 12:1.

14. The method of claim 13, wherein the porous inorganic substrate is a ceramic thermal barrier coating on a gas turbine engine component.

15. The method of claim 13, wherein the conformally coated porous inorganic substrate resists sintering and promotes retention of an original pore structure when exposed to temperatures which promote pore deterioration and/or sintering of the provided porous inorganic substrate.

16. The method of claim 13, wherein the first phosphorus-containing alumina sublayer and the second phosphorus-containing alumina sublayer have different Al/P ratios.

17. The method of claim 13, wherein the provided porous inorganic substrate includes mesopores that constitute 25% to 99.99% of a measured porosity.

18. A method comprising:
providing a porous inorganic substrate;
forming a liquid film having a thickness of 5 to 250 nm on pore walls of the provided porous inorganic substrate, wherein the liquid film is a non-colloidal solution of a phospho-alumina precursor having an aluminum-to-phosphorous atomic ratio of 4:1 to 15:1;

drying the liquid film to yield a dried film; and then
forming a cured phosphorus-containing alumina layer, with a thickness of 1 to 50 nm, conformally coating the pore walls;
the coated substrate having an open porosity that is at least 90% of an open porosity of the provided porous inorganic substrate.

19. The method of claim 18, wherein the provided porous inorganic substrate includes mesopores that constitute 25% to 99.99% of a measured porosity.

* * * * *